Figure 1:
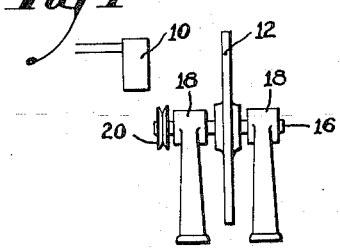

April 10, 1934.  H. V. HAYES  1,954,204

RADIANT ENERGY SIGNALING

Filed March 12, 1932

Witness
H. E. Van Dine

Inventor
Hammond V. Hayes
by Van Everen Fish
Hildreth & Hay Attys.

Patented Apr. 10, 1934

UNITED STATES PATENT OFFICE 1,954,204

RADIANT ENERGY SIGNALING

Hammond V. Hayes, Boston, Mass.

Application March 12, 1932, Serial No. 598,432

2 Claims. (Cl. 250—1)

The present invention relates to radiant energy signaling and more particularly to methods and apparatus included in the class generally termed "radiophones".

In their broadest sense, radiophones may be classified as devices which are responsive to radiations of higher frequencies than those commonly designated as radio or Hertzian waves. These higher frequency waves embrace the radiations commonly referred to as light waves including infra-red rays, visible light, and perhaps ultra-violet, in short, substantially all radiations of wave lengths less than about one-half a centimeter. Such rays are amendable to beam propagation, focusing, and reflection in the same manner as visible light. Signaling with radiant energy in such wave lengths is of practical importance as an aid to navigation, particularly in the determination of position through fog.

Heretofore, radiophones have included some type of radiant energy receiving device such as the bolometer, the thermo-couple, or the photo-electric tube, all of which utilize the radiant energy directly to produce changes in an electrical circuit. Most of these devices, however, are not suitable for practical work, either because of their delicacy, or as in the case of the photo-electric tube, their insensitivity to any rays except those embraced within a narrow band of wave lengths. The photo-electric tube has its maximum sensitivity in the visible light region, that is, rays between 0.4 and 0.78 microns in wave length. It is not sensitive to infra-red rays which are included between the wave lengths of approximately 0.78 microns and 30 microns and which include the greater part of the energy of the transmitted beam. Sensitivity to the long rays of the infra-red spectrum is desirable, not only because of the large proportion of energy in such rays, but also because of their effectiveness in penetrating an atmosphere containing moisture in the form of fog or rain.

The principal object of the present invention is to provide a method and apparatus whereby radiant energy waves including substantially all frequencies of light waves may be transmitted and received at distances of as much as several miles with sufficient amplitude to produce a usable signal.

With this object in view, the principal feature of the present invention contemplates means for transmitting a modulated beam of radiant energy, preferably including a large proportion of fog penetrating infra-red rays, together with a receiving device which is responsive to radiant energy of substantially any wave length. In the best form of the invention yet devised, the receiving apparatus comprises means for transforming modulated waves of radiant energy into compressional waves in a gas such as air, and then transforming the compressional waves into electrical vibrations which may be amplified to an energy sufficient to be utilized as a signal. Such apparatus is non-selective, i. e., it is responsive to radiant energy included within a wide band of wave lengths. The system is simple and easily operated. It may be made in substantially any desired degree of sensitivity and it may be utilized for giving an effective signal over a distance of several miles through a moisture-containing atmosphere.

Other features of the invention consists of certain novel features of construction and modes of operation hereinafter described and particularly defined in the claims.

Figure 2:
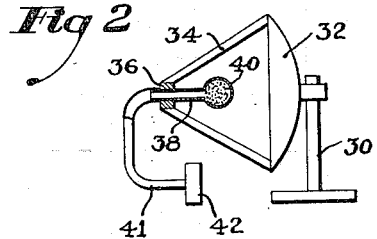
Figure 3:
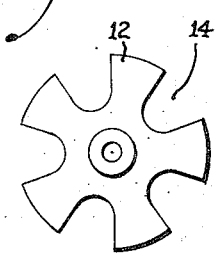
Figure 4:
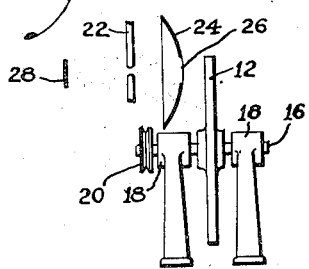
Figure 5:
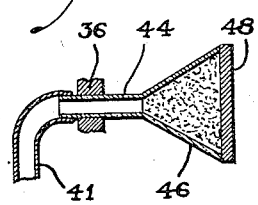
Figure 6:
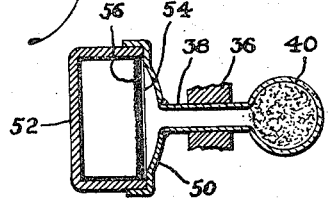
Figure 7:
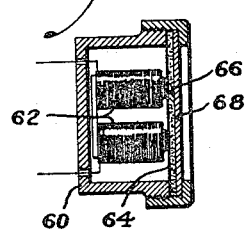
Figure 8:
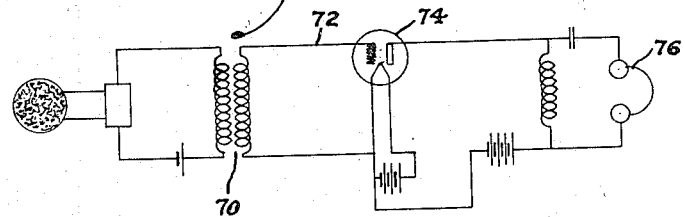

In the accompanying drawing, Fig. 1 is a diagrammatic elevation of a form of transmitting apparatus suitable for use in the present invention; Fig. 2 is an elevation of one form of collector or receiver of radiant energy; Fig. 3 is a detail view of the modulating disk; Fig. 4 is a diagrammatic elevation of the preferred form of transmitting apparatus; Figs. 5, 6 and 7 are sectional elevations of three forms of receiving devices; and Fig. 8 is an electrical diagram illustrating the method of amplifying the electrical vibrations.

The transmitter shown in Fig. 1 is of extremely simple form embodying an electric heater 10 of ordinary construction consisting of a coil of wire in proximity to a flat face plate. The coil is heated from any suitable source and radiant energy largely in the form of infra-red rays passes from the plate into the atmosphere. In close proximity to the face of the heater is a rotating disk 12 of the form shown in Fig. 3, the plane of which is parallel with the face of the plate. Portions 14 of the disk are cut away, such portions being of substantially the same size as the heater plate. The disk 12 is mounted on a shaft 16 which is journaled in bearings 18 and which is rotated in any suitable manner, as indicated by the driving pulley 20. The disk shown in Fig. 3 has five openings 14, thereby permitting the radiant energy to be interrupted or modulated five times for each revolution of the disk. The disk may be revolved at a rate of about 40 revolutions a second so that the beam of radiant energy is modulated at a frequency of 200 cycles per second.

Another and preferable form of transmitting apparatus is shown in Fig. 4. This comprises the disk 12, the shaft 16 and the driving means 20 of the same form as similarly numbered parts in Fig. 1. The source of energy is a carbon arc having the pencils 22. A reflector 24 is placed in front of the arc and is provided with an opening 26 adjacent the periphery of the modulating disk 12, the opening being of about the same size as each of the cut-away portions 14 of the disk. The reflector 24 concentrates a large part of the energy of the arc on an elliptic reflector 28 which is placed in back of the arc and which is of approximately the same size as the opening 26. By this arrangement, a parallel beam of intense radiation composed of both visible and infra-red light is transmitted, and this beam is modulated at a frequency depending upon the speed of rotation of the disk.

Whatever form of transmitting device is employed, a radiant energy collector of the general form shown in Fig. 2 may be used at the receiving station.

This collecting or receiving apparatus comprises a standard 30 to which is connected a parabolic reflector 32 to concentrate the collected rays at the focus thereof. Supported by rods 34 is a frame or collar 36 in which is mounted a tube 38 formed at the end of a sensitive bulb 40. This bulb is filled with a small quantity of dark colored energy absorbing material having a large gas-occluding surface per unit of volume. For this purpose, I have found that carbonized attenuated vegetable fibres in the form of a light fluff are most suitable. The tube 38 connects by a flexible tube 41 with an instrument 42, such as a microphone, for converting sound energy into electrical energy.

The bulb 40, being placed at the focus of the reflector, collects substantially all of the radiant energy that falls on the reflector 32. The carbonized fibres contained in the bulb 40 are extremely sensitive to radiant energy of all wave lengths. The radiant energy falling upon the mass of dark colored fibres causes occluded air and gases to expand and thus to create compressional waves in the tubes 38 and 41. These compressional waves are of the frequency of the modulations produced by the rotation of the disk 12 at the transmitter. The compressional energy in the gas is converted into electrical alternations of the same frequency by the microphone 42.

A modified form of light-sensitive receiving device is shown in Fig. 5. This comprises a glass tube 44 provided with a conical flared portion 46 which is covered with a window of rock salt 48. The flared portion 46 is filled with the carbonized fibres. The tube 44 is mounted in the frame 36, as in the construction previously described, and is connected by the flexible tube 41 with the microphone. The construction embodying a rock salt window is preferred because of the transparency of rock salt to infra-red rays as long as 30 microns in wave length.

A somewhat simpler form of receiving apparatus is shown in Fig. 6, in which the tube 38 is attached directly to the cap 50 of the microphone. As shown in this figure, the microphone comprises a case 52 enclosing a diaphragm 54, the vibrations of which are utilized to change the electrical resistance of carbon granules 56 in the conventional manner. The tube 38 is illustrated as being provided with a bulb 40 of the same type as shown in Fig. 2, although it may be constructed as shown in Fig. 5 with a window transparent to infra-red radiations.

A construction of still more simplified form is illustrated in Fig. 7. The means for converting the compressional waves into electrical vibrations is here illustrated as a telephone instrument of the magnetic type comprising a case 60, a magnet 62, and a diaphragm 64. Immediately adjacent the diaphragm is a layer of carbonized vegetable fibres 66 enclosed between the diaphragm and a rock salt window 68. This entire apparatus may be supported within the frame 36 so that the window 68 lies at the focus of the reflector.

The variations in electrical energy produced by the vibrations of the diaphragm are amplified in any suitable manner, as by the conventional thermionic tube circuit shown in Fig. 8. The microphone is connected through a transformer 70 to the grid circuit 72 of the tube 74, the plate circuit of which includes a translating device indicated as a telephone receiver 76. For the receiver 76 may be substituted any form of apparatus for converting the amplified electrical energy into a usable signal.

The apparatus may be used for radiant energy signaling in any desired manner. For example, as an aid to navigation through fog, a transmitting apparatus may be set up to send out a beam of radiant energy from any point of danger. This beam is picked up in the receiving apparatus by the ship, the direction of the beam being readily determined by moving the receiving apparatus until the maximum response is obtained. The received signal as heard in the phones 76 is a musical note of a frequency corresponding to the frequency of modulation at the transmitting end.

The apparatus is uniformly sensitive to all wave lengths of radiant energy, within the limits of transparency of the window, in other words, the response at the receiver is dependent only upon the amount of radiant energy collected by the sensitive material. Since the greater proportion of energy in a beam of light consists of infra-red energy, and since infra-red rays have a high capacity for penetrating a moisture-containing atmosphere, a usable signal may be received at distances of several miles.

Having thus described the invention, what is claimed is:

1. Apparatus for receiving a modulated radiant energy beam comprising a container enclosing a gas and having a dark gas-occluding substance, a window for the container pervious to substantially the entire infra-red spectrum up to wave lengths of approximately 30 microns, compressional waves being set up in the gas upon impingement of radiant energy on the gas-occluding substance, a diaphragm actuated by the compressional waves in the gas at a frequency corresponding to the frequency of modulation of the beam, means actuated by the diaphragm for converting the energy thereof into electrical energy, an amplifier for the electrical energy, and response means actuated by the electrical vibrations to give a signal.

2. Apparatus for receiving a modulated radiant energy beam comprising a container enclosing a gas and having a dark gas-occluding substance, a window for the container pervious to substantially the entire infra-red spectrum up to wave lengths of approximately 30 microns, means for concentrating the beam on the gas-occluding substance to convert the energy of the beam into compressional waves in the gas at a frequency corresponding to the frequency of modulation of the beam, means for converting the compressional energy into electrical energy including a diaphragm adjacent to the gas-occluding substance, an amplifier for the electrical energy, and a response device actuated by the amplified electrical energy.

HAMMOND V. HAYES.